United States Patent [19]

Smith et al.

[11] 4,156,763
[45] May 29, 1979

[54] COPOLYMERS OF 1,2-DIHYDRO-NAPHTHALENE-TYPE COMPOUNDS AND ALPHA-HYDROCARBYL SUBSTITUTED STYRENES

[75] Inventors: Richard L. Smith; Carl A. Uraneck, both of Bartlesville, Okla.

[73] Assignee: Phillips Petroleum Company, Bartlesville, Okla.

[21] Appl. No.: 879,570

[22] Filed: Feb. 21, 1978

Related U.S. Application Data

[63] Continuation of Ser. No. 490,846, Jul. 22, 1974, abandoned.

[51] Int. Cl.$^2$ ............................................. C08F 232/08
[52] U.S. Cl. ....................................... 526/173; 526/280
[58] Field of Search ................................ 526/173, 280

[56] References Cited

PUBLICATIONS

Chemical Abstracts, vol. 74, 1971, Naumova, No. 13456f.

*Primary Examiner*—Paul R. Michl

[57] ABSTRACT

1,2-Dihydronaphthalene-type compounds and α-hydrocarbyl substituted styrenes are copolymerized utilizing organoalkali metal initiation under polymerization conditions.

21 Claims, No Drawings

COPOLYMERS OF 1,2-DIHYDRO-NAPHTHALENE-TYPE COMPOUNDS AND ALPHA-HYDROCARBYL SUBSTITUTED STYRENES

This is a continuation application of application Ser. No. 490,846, now abandoned.

Field of the Invention

The invention relates to copolymers of 1,2-dihydronaphthalene-type compounds with α-hydrocarbyl substituted styrenes. In another aspect, the invention relates to a method to copolymerize 1,2-dihydronaphthalene-type compounds and α-hydrocarbyl substituted styrenes.

Background of the Invention

Copolymers of 1,2- or of 1,4-dihydronaphthalene with various aliphatic monoolefins have been prepared utilizing Friedel-Crafts type initiators or catalyst systems. Block copolymers of 1,2-dihydronaphthalene with styrene or with vinylpyridine have been prepared by sequential addition of monomers after addition with sodium polyacrylic aromatic compounds. Block copolymers of 1,2-dihydronaphthalene with styrene or isoprene have been prepared by initiation with sodium naphthalene ion-radical.

However, heretofore, it has not been possible to prepare homogeneous, random copolymers of the 1,2-dihydronaphthalene-type compounds with α-hydrocarbyl substituted styrenes.

Objects of the Invention

It is an object of the invention to produce homogeneous random copolymers of the 1,2-dihydronaphthalene-type compounds with α-hydrocarbyl substituted styrenes. It is another object of the invention to provide a process for the copolymerization of the 1,2-dihydronaphthalene-type compounds with α-hydrocarbyl substituted styrenes.

Other aspects, objects and advantages of the invention will become apparent from the study of this disclosure including the appended claims.

BRIEF DESCRIPTION OF THE INVENTION

Copolymers of the 1,2-dihydronaphthalene-type compounds with the α-hydrocarbyl substituted styrenes are prepared by initiation with an organoalkali metal initiator, preferably in the presence of a solvent system, more preferably including a polar solvent. That these polymers are random and not block has been demonstrated by NMR data.

DETAILED DESCRIPTION OF THE INVENTION

Organomono- or polyalkali metal initiators, preferably hydrocarbonlithium initiators, are effective for the copolymerization of the 1,2-dihydronaphthalene-type compounds with α-hydrocarbyl substituted methylstyrenes in a polymerization process preferably employing a polar solvent.

1,2-DIHYDRONAPHTHALENE-TYPE COMPOUNDS

The 1,2-dihydronaphthalene-type compounds is a term used herein as generic to indicate the type of monomer employed. These 1,2-dihydronaphthalene-type monomers include the preferred species 1,2-dihydronaphthalene as well as the substituted 1,2-dihydronaphthalenes. These monomers also can be represented by:

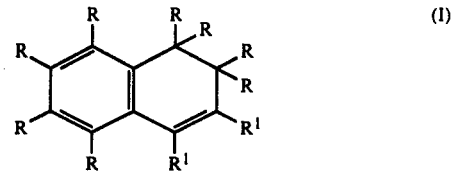

In the above representation of the 1,2-type dihydronaphthalenes useful as one of the comonomers according to the process and composition of our invention, each R can be individually selected from hydrogen, alkyl, cycloalkyl, aryl, and combinations thereof, such as alkaryl, aralkyl, etc. as well as alkoxy, aryloxy, tertiary amine, preferably not over 12 carbon atoms per R group. Each $R^1$ can be hydrogen, methyl, or ethyl, with each $R^1$ alike or different. R and $R^1$ also can be alike or different. Examples of R groups include methyl, ethyl, isopropyl, cyclohexyl, p-tolyl, phenyl, 3-phenylpropyl, butoxy, phenoxy, dimethylamino, and the like. Preferably, the R and $R^1$ groups are such that the 1,2-dihydronaphthalene-type monomers contain up to about 25 carbon atoms; more preferably, for convenience in handling, the (I) monomers contain up to 15 carbon atoms per molecule; and most preferably R and $R^1$ each represent hydrogen so that the preferred monomer is the species 1,2-dihydronaphthaline. Other especially useful monomers include 3-methyl-1,2-dihydronaphthalene, 4-ethyl-6-methyl-1,2-dihydronaphthalene, and 6,8-bis(dimethylamino)-1,2-dihydronaphthalene. Other monomers of the type described include 5-butoxy-8-hexyl-1,2-dihydronaphthalene, 6-phenoxy-1,2,4-trimethyl-1,2-dihydronaphthalene, 5,7-dicyclohexyl-1,1,2-trimethyl-1,2-dihydronaphthalene, 1,1,2,2-tetramethyl-6-p-tolyl-1,2-dihydronaphthalene, 8-dodecyl-3-methyl-1,2-dihydronaphthalene, 7-benzyloxy-3-methyl-1,2-dihydronaphthalene and 3,4-diethyl-5-octyl-1,2-dihydronaphthalene.

α-HYDROCARBYL SUBSTITUTED STYRENES

The term "α-hydrocarbyl substituted styrene" is used herein in a generic sense to indicate the type of comonomer which can be copolymerized with the 1,2-dihydronaphthalenes as hereinbefore described. These α-hydrocarbyl substituted styrenes can be represented by:

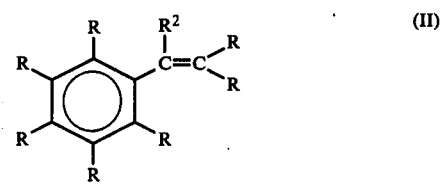

In the above formula representing α-hydrocarbyl substituted styrenes generically, R is as hereinbefore described and $R^2$ is methyl or ethyl such that (II) contains 9 to about 20 carbon atoms, preferably 9-12 carbon atoms. R and $R^2$ are preferably hydrogen and methyl, respectively, so that the preferred monomer is α-methylstyrene. Other useful monomers include α-ethylstyrene, p-tert-butyl-α-methyl-styrene, 3-(m-methoxyphenyl)-2-pentene, and the like.

INITIATOR

In the process of our invention, we employ any of the organo alkali metal initiators, more particularly the hydrocarbon alkali metal initiators in which the alkali metal is selected from Group Ia of the Periodic Table, i.e., lithium, sodium, potassium, rubidium, or cesium. Of these, we presently prefer the hydrocarbon lithium initiators. The hydrocarbon radical can be aliphatic, cycloaliphatic, aromatic, or a combination radical. Presently preferred for convenience and availability, as well as reactivity, are those of up to 20 carbon atoms. Mono-, and polyalkali metal compounds can be employed. Organoalkali metal initiators represented by $R^3M_x$ presently are preferred. $R^3$ represents the hydrocarbon radical, preferably of up to 20 carbon atoms; M the alkali metal, preferably lithium; and x is an integer of 1 to 4. Presently preferred are the hydrocarbon lithium initiators, preferably the hydrocarbyllithium initiators, particularly such as sec-butyllithium and dihydronaphthyllithium.

Suitable organoalkali metal initiators include such as methyllithium, n-butyllithium, sec-butyllithium, tert-butyllithium, cyclopentyllithium, phenyllithium, cyclohexyllithium, 1,4-dilithiobutane, 1,20-dilithioeicosane, and others such as 1,5-dipotassiopentane, 1,2-dipotassiumtriphenylethane, 1,8-dicesiooctane, 4-phenylbutylcesium, 1,4-dirubidiobutane, alone, or in admixture. Lithium adducts prepared by the reaction of lithium with aromatic compounds such as naphthalene and anthracene are suitable. Dilithium adducts of dimers, trimers, and tetramers of conjugated dienes, such as of butadiene or isoprene and the like, can be employed. Reaction products of monolithium compounds and polyvinylphosphine compounds or with polyvinylsilane compounds also are suitable. Thus our reference to organoalkali metal initiators, preferably where the organo portion thereof contains up to 20 carbon atoms per molecule, should be taken in the broad context of those initiators in this class effective to polymerize the described monomers under polymerization conditions.

POLYMERIZATION CONDITIONS

The amount of the polymerization initiator employed can vary widely, depending on conditions of time, temperature, pressure, molecular weight desired, and the like. For most purposes, we suggest the use of between about 0.25 and about 100 millimoles of initiator per 100 grams of total monomer to be polymerized.

Temperature employed in the polymerization also can vary widely, to some extent depending on the pressure employed, type of reactants and other factors. Temperatures, for example, can range from less than $-100°$ C. to greater than $100°$ C. For most purposes, we consider a temperature range of about $-60°$ C. to $90°$ C. to be satisfactory and convenient. At temperatures over about $50°$ C., in some instances, side reactions may tend to occur between the organoalkali metal initiator and the preferred diluent, tetrahydrofuran. Therefore, lower temperatures may be preferable when tetrahydrofuran is employed.

Polymerization pressures employed preferably are at least sufficient to maintain the monomeric materials and the diluent substantially in the liquid phase and can range from such as atmospheric pressure up to about 1000 psig or more.

Time employed for the polymerization can vary widely, depending on the desired conversion to polymer. Reaction times such as 1 minute to 48 hours and more can be employed, although for most purposes we suggest a polymerization interval of at least about 1 hour to achieve reasonable conversion.

The composition of the monomer charge can range widely relative to the proportion of the 1,2-dihydronaphthalene-type monomers and the $\alpha$-hydrocarbyl substituted styrene compounds. There appears no particular limit as long as a positive amount of each is present. Thus, the composition of the monomer charge to be employed in the copolymerization is dependent upon the desired polymer composition which will be influenced by determination of the specific end use to which the polymer is to be applied. The composition of the monomer charge can vary from predominantly one monomer to predominantly the other monomer, such as from 99:1 to 1:99 weight ratio. For most purposes, we consider a weight ratio of 25:75 to 75:25 to provide products of most usefulness.

The polymerization of the monomers can be carried out as a batch or continuous process, adding the monomer charge as a batch charge, or feeding an admixture of the desired proportion of monomers on a continuous basis during the polymerization interval, accompanied by intermittent or continuous feed of initiator, as desired.

The polymerization of the comonomers can be carried out in the presence or absence of a solvent or solvent mixture. The polymerization preferably and conveniently can be carried out in the presence of a solvent or diluent, preferably of the hydrocarbon or polar type or a mixture thereof, most preferably in the presence at least in part of the polar type particularly ethers. Useful solvents include any of the paraffins, cycloparaffins, or aromatics, or combination types, such as heptane, cyclohexane, benzene, toluene, and the like, usually of about 3 to 12 carbon atoms per molecule. Polar solvents can be and preferably are employed, including ethers, tertiary amines, and the like, such as those containing up to 15 carbon atoms per molecule. Exemplary polar solvents include dimethyl ether, diethyl ether, dibenzyl ether, diphenyl ether, anisole, triethylamine, tetramethylethylenediamine, tetrahydrofuran, pyridine, and the like, alone or in admixture. Presently preferred are tetrahydrofuran and mixtures of tetrahydrofuran in any proportion with the hydrocarbons. The diluent employed can be in a wide range relative to the amount of monomers to be polymerized. Suggested for convenience would be amounts from about 50 weight percent to about 95 weight percent of the polymerization mixture.

After the degree of polymerization desired, the polymeric products produced can be recovered by terminating the polymerization with a trace of water or alcohol and then applying standard isolation techniques, such a precipitation into a non-solvent, flashing off solvent, a slurry technique with hot non-solvent, etc.

The molecular weights of the polymers produced can be varied from very low to relatively high, such as lower than 2,000 to 50,000 and higher, as desired. The melting point, softening point, solvent resistance, etc., of the novel copolymers can be varied by varying the dihydronaphthalene:$\alpha$-ethylstyrene monomer ratios. Lower molecular weight polymers are suitable for plasticizers, adhesives, caulks, as paint and lacquer formulation components, and the like, while the higher molecular weight polymers are useful for resins and coatings, particularly those of higher $\alpha$-methylstyrene content, and other of the higher molecular weight polymers will be useful in some applications for rubbery polymers.

Chain transfer occurring during polymerization has some tendency to hold down molecular weight of the final product.

Examples hereinafter constitute a further portion of our disclosure to assist the practitioner of the arts in a further understanding of our invention. Particular species used, relationships, amounts, are expected to be of assistance in understanding our invention, and are to be considered a portion of our disclosure and not limitative of the reasonable extent and scope of our invention.

EXAMPLE I

Copolymers of 1,2-dihydronaphthalene and α-methylstyrene were prepared using variable ratios of the monomers, with sec-butyllithium as the organo alkali metal initiator. Recipes for the three runs were as follows:

| Recipe: | Run 1 | Run 2 | Run 3 |
|---|---|---|---|
| 1,2-Dihydronaphthalene, phm[a] | 67 | 50 | 33 |
| α-Mathylstyrene, phm | 33 | 50 | 67 |
| Tetrahydrofuram, phm | 294 | 147 | 73 |
| sec-Butyllithium, mhm[b] | 1 | 1 | 0.67 |
| Temperature, °C. | 25 | 25 | 25 |
| Polymerization time, minutes | 80 | 80 | 80 |

[a]Parts by weight per 100 parts by weight of monomer.
[b]Millimoles per 100 parts of monomer.

Charge order in each case was tetrahydrofuran, 1,2-dihydronaphthalene, α-methylstyrene to closed reactors; initiator poisons destroyed by adding sec-butyllithium until the yellow to red color of monomer-lithium persists, which amount is not included in amounts indicated above; then the amount of sec-butyllithium desired is added as indicated above.

Above the indicated temperature and time of polymerization , the products obtained were isolated by adding the reactor contents to isopropanol, filtration of the polymer, and vacuum drying at about 50° C. Results obtained were as follows for the several polymers:

TABLE I

| Run | Conversion, % | Melting point,°C. | Mw × 10⁻³[f] | Mn × 10⁻³[f] | HI[g] | IV[h] | Gel. %[i] |
|---|---|---|---|---|---|---|---|
| 1 | 96[c] | 250 | 12.7 | 6.4 | 2.0 | 0.08 | 0 |
| 2 | 96[d,e] | 230–235 | 17.0 | 7.8 | 2.2 | 0.09 | 0 |
| 3 | 96[e] | 240–250 | 26.2 | 12.6 | 2.1 | 0.15 | 0 |

[c]Determined by GLC analysis of residual monomer.
[d]Polymerization died before complete conversion was reached. 1.3 Mhm additional sec-butyllithium was added to complete the reaction.
[e]Determined by solids recovery from aliquot of the reaction solution.
[f]Determined by universal calibration curve for GPC referred to by Kraus, G., and Stacy, C. J., 10 J. Polymer Sci. A-2, 657 (1972).
[g]Heterogensity index.
[h]Determined by the method described in U.S. Pat. No. 3,278,508, col. 20, note a, using tetrahydrofuran as solvent.
[i]Determined by the method described in U.S. Pat. No. 3,278,508, col. 20, note b, using tetrahydrofuran as solvent.

Data obtained by nmr analysis of the 50/50 copolymer of Run 2 were consistent with the assignment of random-incorporated monomer sequence. Broad major aliphatic carbon peaks occurred at 18.6, 23,4, 28,0, 37.0, 42.9, and 46.4 ppm, from tetramethylsilane. Two major aromatic C-H peaks occurred at 125 and 127 ppm. Five substituted aromatic resonances occurred at 138, 140, 141, 147, and 149 ppm. Uniform molecular weight distribution, heterogeneity index about 2.2, as observed by gel permeation chromatography, uniform disappearance of monomers during polymerization, and formation of a homogeneous and soluble polymer, all confirmed production of the desired copolymer. If large blocks of homopolymeric polydihydronaphthalene were produced, for example, this would result in inhomogeneity and insolubility.

EXAMPLE II

Further polymers were prepared using a hydrocarbon solvent, mixture of the hydrocarbon solvent with a polar compound, and using a polar compound only as diluent. The polar compound employed in these runs was tetrahydrofuran. The following recipes were employed:

|  | Run 4 | Run 5 | Run 6 |
|---|---|---|---|
| 1,2-Dihydronaphthalene, phm | 50 | 50 | 50 |
| α-Methylstyrene, phm | 50 | 50 | 50 |
| Toluene, phm | 890 | 845 | 0 |
| Tetrahydrofuran, phm | 0 | 45 | 890 |
| sec-Butyllithium, mhm | 12 | 12 | 1.3 |
| Polymerization temp., °C. | 25 | 25 | 0 |
| Polymerization time, hours | 20 | 20 | 4 |
| Conversion % | 18 | 80 | 100 |

The same general procedures of Example I were employed. The data above show the much higher rates of conversion of monomers to copolymer obtained by using either a mixed solvent including at least a small amount of polar compound, or using a straight polar compound solvent-diluent rather than a hydrocarbon diluent. The polymer of Run 6 was completely soluble in tetrahydrofuran, and exhibited a melting point of 240°–250° C., thus indicating homogeneous structure.

EXAMPLE III

Further polymerizations were made copolymerizing 1,2-dihydronaphthalene with α-methylstyrene, employing various admixtures with a differing polar compound than employed in Example II, using tetramethylethylenediamine (TMED) in these runs. Recipes employed were as follows:

|  | Run 7 | Run 8 | Run 9 | Run 10 |
|---|---|---|---|---|
| 1,2-Dihydronaphthalene, phm | 50 | 50 | 50 | 50 |
| α-Methylstyrene, phm | 50 | 50 | 50 | 50 |
| Toluene, phm | 845 | 801 | 668 | 445 |
| TMED, phm | 45 | 89 | 222 | 445 |
| sec-Butyllithium, mhm[j] | 9 | 18 | 35 | 100 |
| Polymerization temp., °C. | 25 | 25 | 25 | 25 |
| Polymerization time, hours | 20 | 20 | 20 | 20 |
| Conversion, % | 15 | 45 | 67 | 92 |

[j]Total initiator employed is shown above including that used to kill poisons as well as to polymerize. TMED tends to contain small amounts of initiator poisons; thus, in a polymerization employing TMED, somewhat greater quantities of initiator are required.

General procedures and polymer workup as described in Example I were employed.

The data above indicate improved conversion of monomers to copolymer can be obtained when mixtures of hydrocarbon and polar compound are employed rather than the hydrocarbon alone as noted in Example II on Run 4. In general, increasing the proportion of polar compound relative to hydrocarbon solvent tends to increase the percentage conversion of monomers to copolymer.

EXAMPLE IV

Attempts were made to copolymerize 1,2-dihydronaphthalene (DHN) with styrene (S) or with butadiene (B), rather than copolymerization with α-methylstyrene (AMS). The recipe and results are shown below, showing proportions of monomers employed, with the polymerization conducted in a polar compound as solvent, and analyses made every few minutes to determine rate of polymerization of each individual monomer.

TABLE IV

|  | Run 11 | Run 12 | Run 6 |
|---|---|---|---|
| Tetrahydrofuran, phm | 760 | 890 | 890 |
| Monomers | B/DHN | S/DHN | AMS/DHN |
| Monomer ratio, phm | 58/42 | 50/50 | 50/50 |
| sec-Butyllithium, mhm | 2 | 2 | 1.3 |
| Temperature, °C. | 0 | 0 | 0 |
| Time | Monomers polymerized, parts[(k)] | | |
| 1 minutes | —[(l)] | 50/7.5 | 5/9.5 |
| 2 minutes | — | — | 9/12.5 |
| 4 minutes | 28/0 | — | 13/15 |
| 8 minutes | — | — | 20/26 |
| 16 minutes | — | — | 28/30 |
| 30 minutes | 37/0 | 50/11.5 | 36/39 |
| 60 minutes | — | — | 41/— |
| 2 hours | — | — | 47/46 |
| 4 hours | — | — | 50/50 |
| 16 hours | 49/4 | 50/43 | — |

[(k)]Percentage conversion equals sum of parts of monomers polymerized. Amounts of unreacted monomers were determined by glc using tetralin (present in 1,2-dihydronaphthalene as an impurity) as an internal standard.
[(l)]Dashes denote values not determined.

When efforts were made to copolymerize butadiene or styrene with dihydronaphthalene to produce random copolymers, it was found that the butadiene or styrene polymerized much more rapidly than did the 1,2-dihydronaphthalene. The polymeric products thus obtained were inhomogeneous, and only partially soluble in THF, indicating formation of mixtures of homopolymers, or of copolymers with relatively long homopolymeric polybutadiene blocks or homopolymeric polystyrene blocks, or homopolymeric polydihydronaphthalene blocks.

The working examples, species and conditions employed therein, knowledge and background of the field of the invention together with general principles of chemistry and other applicable sciences, have formed the bases for the broad descriptions of the invention including the ranges of conditions and generic groups of operant components and for our claims here appended.

We claim:

1. A polymerization process for producing random copolymers of 1,2-dihydronaphthalene-type monomers and α-hydrocarbyl substituted styrene-type monomers which comprises copolymerizing monomers consisting essentially of at least one said 1,2-dihydronaphthalene-type monomer with at least one said α-hydrocarbyl substituted styrene-type monomer under polymerization conditions with an organo lithium initiator, thereby producing said random copolymer.

2. The polymerization process according to claim 1 wherein said 1,2-dihydronaphthalene-type monomer is represented by

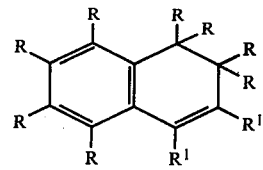

wherein each R is selected from hydrogen, alkyl, cycloalkyl, aryl, or combination radical, alkoxy, aryloxy, tertiary amine; and $R^1$ is selected from hydrogen, methyl, or ethyl.

3. The process according to claim 1 wherein said α-hydrocarbyl substituted styrene-type monomer is represented by:

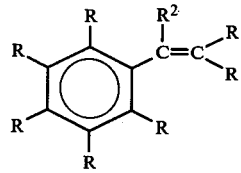

wherein each R is selected from hydrogen, alkyl cycloalkyl, aryl, or combination radical, alkoxy, aryloxy, tertiary amine; and $R^2$ is selected from methyl or ethyl.

4. The process according to claim 1 wherein said 1,2-dihydronaphthalene-type compound contains up to 25 carbon atoms, and said α-hydrocarbyl substituted styrene-type monomer contains up to 20 carbon atoms.

5. The process according to claim 2 wherein each R contains up to 12 carbon atoms and each $R^1$ contains up to 2 carbon atoms, such that each 1,2-dihydronaphthalene monomer contains up to 15 carbon atoms per molecule, and said α-hydrocarbyl substituted styrene-type monomer contains up to 12 carbon atoms per molecule.

6. The process according to claim 1 employing a monomer weight ratio of said 1,2-dihydronaphthalene-type monomer:said α-hydrocarbyl substituted styrene-type monomer of about 99:1 to 1:99.

7. The process according to claim 6 wherein said monomer weight ratio is about 25:75 to 75:25.

8. The process according to claim 1 wherein in said initiator the organo radical thereof contains up to 20 carbon atoms per molecule.

9. The process according to claim 8 wherein said organo lithium initiator is represented by $R^3M_x$ wherein $R^3$ represents a hydrocarbon radical of 20 carbon atoms, M is said lithium, and x is an integer of 1 to 4, inclusive.

10. The process according to claim 8 wherein said hydrocarbon lithium initiator is used in an amount sufficient to provide about 0.25 to 100 millimoles per 100 grams of total monomer employed; and said polymerization conditions include a polymerization temperature of about −60° C. to 90° C.

11. The process according to claim 10 wherein said polymerization further is conducted in the presence of a hydrocarbon or polar diluent or a mixture thereof wherein said hydrocarbon diluent is a paraffin, cycloparaffin, aromatic compound, or mixture thereof, and contains up to 15 carbon atoms per molecule, and wherein said polar compound diluent solvent is an ether or tertiary amine containing up to 15 carbon atoms per molecule.

12. The process according to claim 11 wherein said 1,2-dihydronaphthalene-type monomer is the species 1,2-dihydronaphthalene, said α-hydrocarbyl substituted styrene-type monomer is α-methylstyrene, and said polymerization is conducted in the presence of a diluent wherein at least a portion thereof is tetrahydrofuran or tetramethylethylenediamine.

13. The process of copolymerization wherein monomers consisting essentially of at least one 1,2-dihydronaphthalene-type monomer and at least one α-hydrocarbyl substituted styrene-type monomer are copolymerized under polymerization conditions employing a hydrocarbyllithium initiator, thereby producing a random copolymer of said 1,2-dihydronaphthalene-type monomer with said α-hydrocarbyl substituted styrene-type monomer.

14. As a composition of matter, a substantially random copolymer of a 1,2-dihydronaphthalene-type monomer and an α-hydrocarbyl substituted styrene-type monomer wherein said copolymer has a weight average molecular weight of at least about 12000.

15. The copolymer according to claim 14 characterized by a weight ratio of about 99:1 to 1:99 1,2-dihydronaphthalene-type monomer:α-hydrocarbyl substituted styrene-type monomer.

16. The copolymer according to claim 14 wherein said 1,2-dihydronaphthalene-type monomer contains up to 25 carbon atoms per molecule and is represented by

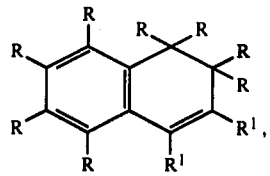

and said α-hydrocarbyl substituted styrene-type monomer contains up to 20 carbon atoms per molecule and is represented by:

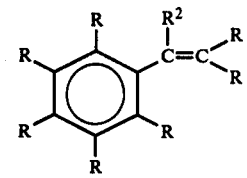

wherein each R is selected from hydrogen, alkyl, cycloalkyl, aryl, or combination radical, alkoxy, aryloxy, tertiary amine; $R^1$ is selected from hydrogen, methyl, or ethyl; and $R^2$ is selected from methyl or ethyl.

17. The copolymer according to claim 16 wherein said monomers are incorporated in a weight relationship of about 75:25 to about 25:75.

18. The copolymer according to claim 17 of 1,2-dihydronaphthalene and α-methylstyrene containing about 67 weight percent copolymerized 1,2-dihydronaphthalene and 33 weight percent copolymerized α-methylstyrene.

19. The copolymer according to claim 17 of 1,2-dihydronaphthalene and α-methylstyrene containing about 50 weight percent copolymerized 1,2-dihydronaphthalene and 50 weight percent copolymerized α-methylstyrene.

20. The copolymer according to claim 17 of 1,2-dihydronaphthalene and α-methylstyrene containing about 33 weight percent copolymerized 1,2-dihydronaphthalene and 67 weight percent copolymerized α-methylstyrene.

21. The copolymer according to claim 16 with an $M_w$ of about 12000 to 50000.

* * * * *